United States Patent
Hars et al.

(10) Patent No.: US 7,213,004 B2
(45) Date of Patent: May 1, 2007

(54) APPARATUS AND METHODS FOR ATTACKING A SCREENING ALGORITHM BASED ON PARTITIONING OF CONTENT

(75) Inventors: Laszlo Hars, Cortlandt Manor, NY (US); Antonius A. M. Staring, Eindhoven (NL); Andre Weimerskirch, Eppstein (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 488 days.

(21) Appl. No.: 09/998,082

(22) Filed: Nov. 29, 2001

(65) Prior Publication Data

US 2002/0152172 A1    Oct. 17, 2002

Related U.S. Application Data

(60) Provisional application No. 60/283,323, filed on Apr. 12, 2001.

(51) Int. Cl.
*G06Q 99/00* (2006.01)

(52) U.S. Cl. .............. 705/57; 705/50; 705/51
(58) Field of Classification Search ............ 705/57, 705/58, 50, 51; 380/202, 203, 204, 228, 380/286; 713/194, 162, 172
See application file for complete search history.

(56) References Cited

U.S. PATENT DOCUMENTS 6,640,305 B2 * 10/2003 Kocher et al. .............. 713/194

2002/0107802 A1 * 8/2002 Philips ....................... 705/51
2005/0010795 A1 * 1/2005 Tagawa et al. ............. 713/193

FOREIGN PATENT DOCUMENTS

JP    2001036516 A  *  2/2001

OTHER PUBLICATIONS

Secure Digital Music Initiative (SDMI), SDMI Portable Device Specification, Part 1, Version 1.0, pp. 1-35, Jul. 8, 1999.
Secure Digital Music Intitiative (SDMI), Amendment 1 to SDMI Portable Device Specification, Part 1, Version 1.0, pp. 1-2, Sep. 23, 1999.
Secure Digital Music Initiative (SDMI), Guide to the SDMI Portable Device Specification, Part 1, pp. 1-5.
Kalker : "System issues in digital image and video watermarking for copy protection" Proceedings Of The International Conference On Multimedia Computing And Systems, Jun. 7, 1999, pp. 562-567.

* cited by examiner

*Primary Examiner*—Elisca Pierre Eddy (57) ABSTRACT

Apparatus and methods for attacking a screening algorithm. Content to be downloaded is identified. The identified content is then partitioned into at least two sections, wherein each of the at least two sections has a duration which is less than a duration of a threshold duration value assigned by the screening algorithm, and the partitioned content is subjected to a screening algorithm. Once the content has been successfully downloaded, the integrity of the downloaded content may be restored by reassembling the sections.

14 Claims, 5 Drawing Sheets

APPARATUS AND METHODS FOR ATTACKING A SCREENING ALGORITHM BASED ON PARTITIONING OF CONTENT

CROSS REFERENCE TO RELATED APPLICATION

This application claims priority to the U.S. provisional patent application identified by Ser. No. 60/283,323, filed on Apr. 12, 2001, the disclosure of which is incorporated by reference herein.

FIELD OF THE INVENTION

The present invention relates generally to the field of secure communication, and more particularly to techniques for attacking a screening algorithm.

BACKGROUND OF THE INVENTION

Security is an increasingly important concern in the delivery of music or other types of content over global communication networks such as the Internet. More particularly, the successful implementation of such network-based content delivery systems depends in large part on ensuring that content providers receive appropriate copyright royalties and that the delivered content cannot be pirated or otherwise subjected to unlawful exploitation.

With regard to delivery of music content, a cooperative development effort known as Secure Digital Music Initiative (SDMI) has recently been formed by leading recording industry and technology companies. The goal of SDMI is the development of an open, interoperable architecture for digital music security. This will answer consumer demand for convenient accessibility to quality digital music, while also providing copyright protection so as to protect investment in content development and delivery. SDMI has produced a standard specification for portable music devices, the SDMI Portable Device Specification, Part 1, Version 1.0, 1999, and an amendment thereto issued later that year, each of which are incorporated by reference. The longer-term effort of SDMI is an overall architecture for delivery of digital music in all forms.

The illicit distribution of copyright material deprives the holder of the copyright legitimate royalties for this material, and could provide the supplier of this illicitly distributed material with gains that encourage continued illicit distributions. In light of the ease of information transfer provided by the Internet, content that is intended to be copy-protected, such as artistic renderings or other material having limited distribution rights, are susceptible to wide-scale illicit distribution. For example, the MP3 format for storing and transmitting compressed audio files has made the wide-scale distribution of audio recordings feasible, because a 30 or 40 megabyte digital audio recording of a song can be compressed into a 3 or 4 megabyte MP3 file. Using a typical 56 kbps dial-up connection to the Internet, this MP3 file can be downloaded to a user's computer in a few minutes. Thus, a malicious party could read songs from an original and legitimate CD, encode the songs into MP3 format, and place the MP3 encoded song on the Internet for wide-scale illicit distribution. Alternatively, the malicious party could provide a direct dial-in service for downloading the MP3 encoded song. The illicit copy of the MP3 encoded song can be subsequently rendered by software or hardware devices, or can be decompressed and stored onto a recordable CD for playback on a conventional CD player.

A number of schemes have been proposed for limiting the reproduction of copy-protected content. SDMI and others advocate the use of "digital watermarks" to identify authorized content.

U.S. Pat. No. 5,933,798, "Detecting a watermark embedded in an information system," issued Jul. 16, 1997 to Johan P. Linnartz, discloses a technique for watermarking electronic content, and is incorporated by reference herein. As in its paper watermark counterpart, a digital watermark is embedded in the content so as to be detectable, but unobtrusive. An audio playback of a digital music recording containing a watermark, for example, will be substantially indistinguishable from a playback of the same recording without the watermark. A watermark detection device, however, is able to distinguish these two recordings based on the presence or absence of the watermark. Because some content may not be copy-protected and hence may not contain a watermark, the absence of a watermark cannot be used to distinguish legitimate from illegitimate material.

Other copy protection schemes are also available. For example, European Patent No. EP983687A2, "Copy Protection Schemes for Copy-protected Digital Material," issued Mar. 8, 2000 to Johan P. Linnartz and Johan C. Talstra, presents a technique for the protection of copyright material via the use of a watermark "ticket" that controls the number of times the protected material may be rendered, and is incorporated by reference herein.

An accurate reproduction of watermarked content will cause the watermark to be reproduced in the copy of the watermarked content. An inaccurate, or lossy reproduction of watermarked content, however, may not provide a reproduction of the watermark in the copy of the content. A number of protection schemes, including those of the SDMI, have taken advantage of this characteristic of lossy reproduction to distinguish legitimate content from illegitimate content, based on the presence or absence of an appropriate watermark. In the SDMI scenario, two types of watermarks are defined: "robust" watermarks, and "fragile" watermarks. A robust watermark is one that is expected to survive a lossy reproduction that is designed to retain a substantial portion of the original content, such as an MP3 encoding of an audio recording. That is, if the reproduction retains sufficient information to allow a reasonable rendering of the original recording, the robust watermark will also be retained. A fragile watermark, on the other hand, is one that is expected to be corrupted by a lossy reproduction or other illicit tampering.

In the SDMI scheme, the presence of a robust watermark indicates that the content is copy-protected, and the absence or corruption of a corresponding fragile watermark when a robust watermark is present indicates that the copy-protected content has been tampered with in some manner. An SDMI compliant device is configured to refuse to render watermarked material with a corrupted watermark, or with a detected robust watermark but an absent fragile watermark, except if the corruption or absence of the watermark is justified by an "SDMI-certified" process, such as an SDMI compression of copy-protected content for use on a portable player. For ease of reference and understanding, the term "render" is used herein to include any processing or transferring of the content, such as playing, recording, converting, validating, storing, loading, and the like. This scheme serves to limit the distribution of content via MP3 or other compression techniques, but does not affect the distribution of counterfeit unaltered (uncompressed) reproductions of content material. This limited protection is deemed commercially viable, because the cost and inconvenience of downloading an extremely large file to obtain a song will tend to discourage the theft of uncompressed content.

Despite SDMI and other ongoing efforts, existing techniques for secure distribution of music and other content suffer from a number of significant drawbacks. For example, SDMI has recently proposed the use of a new screening algorithm referred to as SDMI Lite. The SDMI Lite algorithm essentially screens a limited number of segments of the content which is being downloaded. Moreover, the algorithm only screens segments having a predetermined duration of time. Prior to adopting this screening algorithm industry wide, apparatus and methods must be identified which would successfully circumvent proposed screening algorithms.

SUMMARY OF THE INVENTION

The present invention provides apparatus and methods for attacking and circumventing a screening algorithm e.g., the above-noted SDMI Lite screening algorithm. The invention in an illustrative embodiment involves the partitioning of content to the point where the attacker's chance of successfully admitting the illicit content is greatly improved.

An advantage of the present invention is that it identifies at least one fault in a security screening algorithm. It is only through the detection and identification of faults that the underlying screening algorithm can be improved to provide convenient, efficient and cost-effective protection for all content providers.

In accordance with one aspect of the invention, a method of attacking a screening algorithm includes the steps of identifying content to be admitted, partitioning the content into at least two sections wherein each of the at least two sections has a duration which is less than a duration of a threshold duration value assigned by the screening algorithm, and subjecting the content to the screening algorithm. Once the content has been successfully admitted, the integrity of the admitted content may be restored by reassembling the sections.

These and other features and advantages of the present invention will become more apparent from the accompanying drawings and the following detailed description.

DETAILED DESCRIPTION OF THE INVENTION

The present invention provides apparatus and methods which attack and circumvent screening algorithms that rely on a sampling of data, and, specifically, the proposed SDMI Lite and CDSafe screening algorithms. The CDSafe algorithm is described in pending U.S. patent application Ser. No. 09/536,944, filed Mar. 28, 2000 in the name of inventors Toine Staring, Michael Epstein and Martin Rosner, entitled "Protecting Content from Illicit Reproduction by Proof of Existence of a Complete Data Set via Self-Referencing Sections," and is incorporated by reference herein. The methods are based on the concept of partitioning of content to the point where the attacker's chances of successfully admitting the illicit content are greatly improved.

Advantageously, the invention detects faults in the proposed security screening algorithms. It is only through the detection and identification of faults that the underlying screening algorithm can be improved to provide convenient, efficient and cost-effective protection for all content providers.

One goal of SDMI is to prevent the unlawful and illicit distribution of content on the Internet. In an attempt to accomplish this goal, SDMI has proposed methods of screening content that has been identified to be admitted. One such proposal is the previously-mentioned SDMI Lite screening algorithm. The new SDMI Lite screening algorithm was proposed in an attempt to increase the performance of SDMI. The term "downloaded" as that term is used herein is interchangeable with the term admitted.

Generally, the SDMI Lite screening algorithm randomly screens a predetermined number of sections of the marked content to determine whether the content is legitimate. However, the proposed SDMI Lite screening algorithm only checks sections having a predetermined duration of time. That is, the SDMI Lite screening algorithm will not screen sections of content that do not exceed a certain threshold value (such as, e.g., a section must be at least fifteen seconds long to meet the threshold value and therefore be subjected to the screening process). Therefore, this and other similar screening algorithms are susceptible to an attack whereby content is partitioned into sections which are shorter in duration than the predetermined duration of time.

Moreover, another threshold value which is relevant for consideration, in view of an attack on a screening algorithm, is the minimum amount of content material that is required to reliably detect a watermark. That is, SDMI may set a window of fifteen seconds (as discussed above) to launch the screening algorithm. However, the watermark detector only needs approximately five (5) seconds out of the fifteen second window to detect a watermark. Therefore, screening algorithms are susceptible to an attack whereby content is partitioned into sections which are shorter in duration than the duration of time which is required to detect a watermark.

The present invention is achieved by initiating an attack on a screening algorithm by partitioning the content into small sections and passing these small sections through the screening algorithm. More specifically, with reference to FIG. 1, one method of attacking the proposed SDMI Lite screening algorithm and the CDSafe algorithm is to partition content 12 that is identified and proposed to be downloaded from an external source such as, for example, the Internet 10. As used herein, the term "partition" refers to the act of separating content that the attacker knows to be illegitimate into a number of sections 18, e.g., N sections as shown, such that the illegitimate content 12 will pass the screening algorithm 14. That is, if the content 12 is partitioned into sections that are small enough to not be detected by the screening algorithm 14 (i.e., to not meet the time duration threshold value required by the algorithm) then such sections 18 will be permitted to pass through the screen 14. Additionally, by partitioning content 12, the attacker is actually destroying a watermark embedded in content 12, thereby making the watermark undetectable to the screening algorithm. Moreover, even if a small section of the watermark is detected by the screening algorithm, the section of content may not be rejected since the identifying watermark has likely been altered beyond recognition, by the partitioning process.

Figure 1:
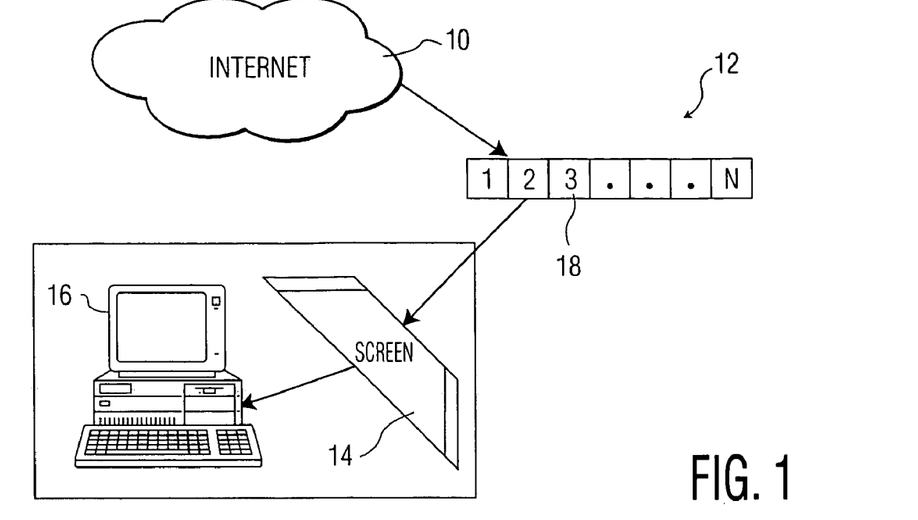
FIG. 1 is a schematic diagram illustrating an illustrative embodiment of the present invention.

To complete the attack, once all of the sections 18 have passed through the screening algorithm, the partitioned sections are reassembled within a personal computer 16, to restore the integrity of the illicit content. Personal computer 16 is an illustrative example of a processing device that may be used to implement, e.g., a program for executing the method of attacking a screening algorithm described herein. The processing device may include a processor and a memory which communicate over at least a portion of a set of one or more system buses.

Personal computer 16 may be representative of any type of processing device for use in implementing at least a portion of a method of attacking a screening algorithm in accordance with the present invention. The elements of personal computer 16 may correspond to conventional elements of such processing devices.

For example, the personal computer may represent a microprocessor, central processing unit (CPU), digital signal processor (DSP), or application-specific integrated circuit (ASIC), as well as portions or combinations of these and other processing devices. The memory is typically an electronic memory, but may comprise or include other types of storage devices, such as disk-based optical or magnetic memory.

The techniques described herein may be implemented in whole or in part using software stored and executed using the respective memory and processor elements of personal computer 16. It is noted that personal computer 16 may include other elements not shown, or other types and arrangements of elements capable of providing the attack functions described herein.

Figure 2:
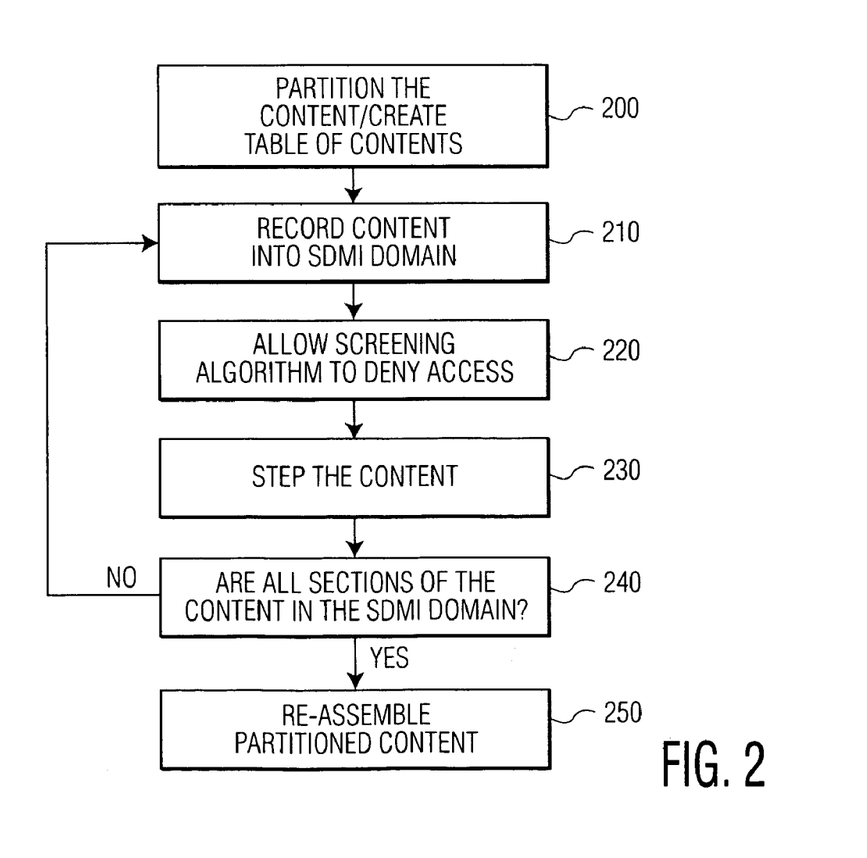
FIG. 2 is a flow diagram illustrating the steps of a method of attack on a screening algorithm in accordance with an illustrative embodiment of the present invention.

Referring now to FIG. 2, a flow diagram is shown illustrating a method of attacking a screening algorithm in accordance with an embodiment of the present invention.

The first step 200 in an embodiment of the method of attacking a screening algorithm in accordance with the present invention is to partition the illicit content into N sections and create a table of contents relating to the N sections. The purpose of creating a table of contents corresponding to the sections is to allow the attacker to be able to recreate the illicit content once it passes through the screening algorithm. The duration of each section is, in part, a function of the screening algorithm. That is, the duration of each section is preferably less than the duration of a section threshold duration value assigned by the screening algorithm.

Once the content is partitioned, the content is recorded in the SDMI domain in step 210. The SDMI domain represents an environment in which all SDMI rules and behaviors are obeyed. After recording the content in the SDMI domain, the content will be subjected to an SDMI screening algorithm such as CDSafe or SDMI Lite. Although the content has been partitioned, depending on the constraints set in the screening algorithm, it is possible that not all of the sections will pass the screening algorithm on the first pass. Thus, it is expected that, in step 220, the screening algorithm will deny access to at least a portion of the content. However, it is also expected that at least one partitioned section of the content will be admitted past the screening algorithm (i.e., into the SDMI domain). Some variants of the screening algorithm may allow detection of a single illicit section to cause the algorithm to deny access to the content. Therefore, at least two (2) or three (3) sections will likely be admitted by the screening algorithm with acceptable probability.

In step 230, content is stepped to allow a new group of sections to be subjected to the screening algorithm. The term "stepping the content," as used herein, refers to the process of storing the sections that were previously admitted and subjecting the remaining content to the screening algorithm. The section or sections of content that were permitted to pass the screening algorithm are stored in a memory device, such as a memory device associated with personal computer 16 in FIG. 1.

After stepping the content, in step 240 the content is analyzed to determine whether all sections of the content have been admitted past the screening algorithm. If all sections of the content have not been admitted into the SDMI domain, the sections that have been admitted are at least temporarily stored within the SDMI domain and steps 210 through 240 are repeated with regard to those sections which were not admitted. This process continues until all sections of the content have been admitted into the SDMI domain.

As indicated in step 250, when all sections of the content have passed the screening algorithm, the partitioned content is re-assembled into its initial configuration. At this point, the attacker has successfully downloaded illicit content, thereby circumventing the screening algorithm.

Figure 3:
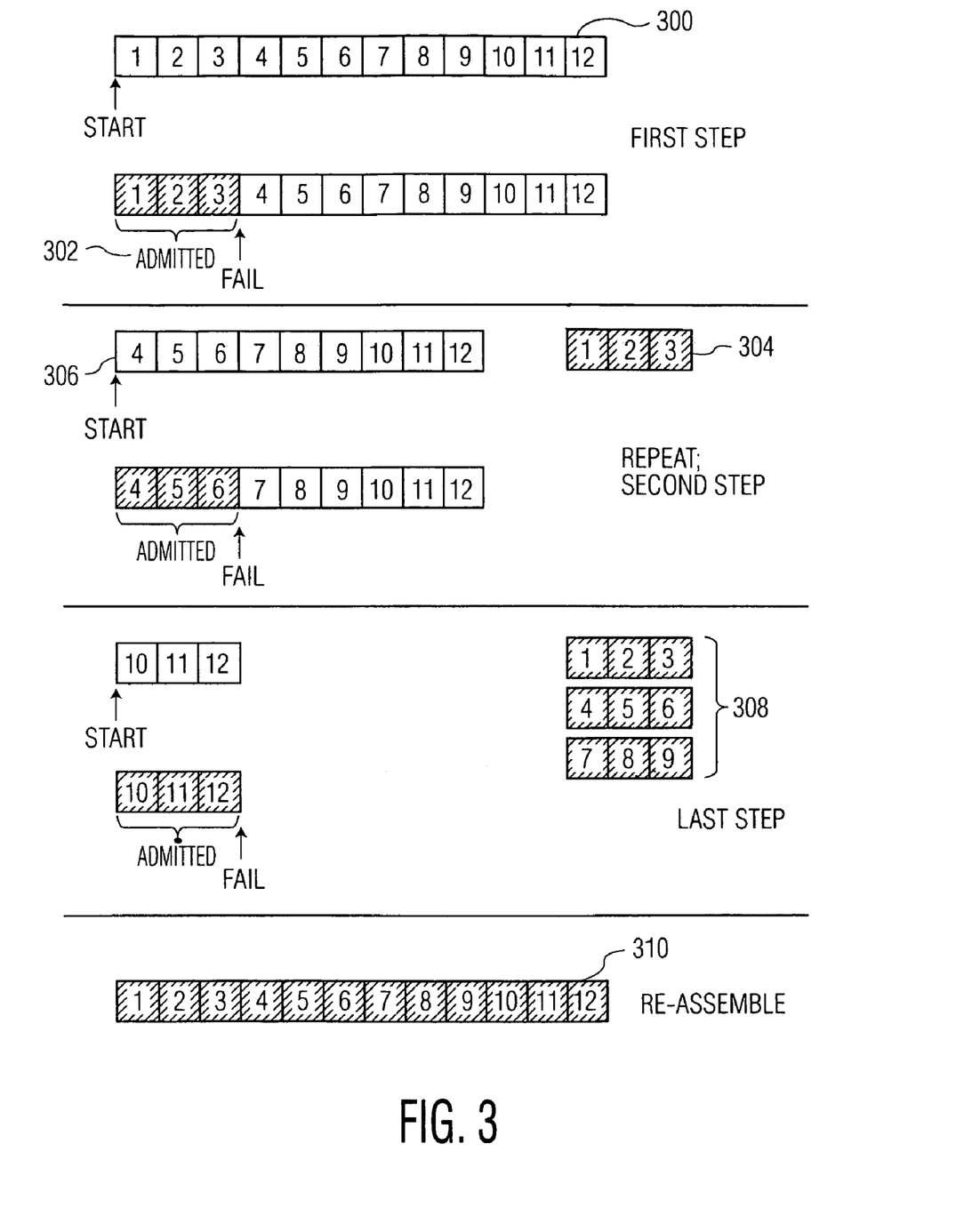
FIG. 3 is a diagram illustrating an example of the steps of a method of attack on a screening algorithm in accordance with the embodiment described with reference to FIG. 2.

Referring now to FIG. 3, a diagram illustrating an example of the steps of a method of attack on a screening algorithm in accordance with the embodiment described above with reference to FIG. 2 is shown. Initially, a block of content 300 is partitioned into a predetermined number of sections. In the illustrative embodiment illustrated in FIG. 3, content 300 is partitioned into twelve (12) sections. A table of contents (not shown) is created to identify the relative positions of the partitioned sections, such that the attacker will have the ability to re-assemble the content once it has been admitted into the SDMI domain.

As indicated, the screening algorithm begins the screening process at the beginning of section one (1). During the screening process, sections 1, 2, and 3 were admitted into the SDMI domain (see reference number 302) before the screening algorithm detected illicit material and failed at section 4.

Since all sections of the content have not yet passed into the SDMI domain, to facilitate the step of resubmitting the remaining block of content 306 to the screening algorithm, the three sections 304 that were admitted are separated from content 300, and are stored in memory. The remaining content 306 is submitted to the screening algorithm beginning with section 4. This is referred to as stepping the content in FIG. 2. After proceeding with the process three times, nine (9) sections 308 of content 300 have been admitted into the SDMI domain and have been stored in memory apart from the remaining content.

The example of FIG. 3 assumes that three (3) sections are admitted each time that the content is submitted to the screening algorithm. Thus, for content 300 which was partitioned into twelve sections, the procedure will need to be repeated four times for the entire content to be admitted into the SDMI domain where it can be re-assembled. The final step in the process is to re-assemble the content, as indicated by reference numeral 310.

Figure 4:
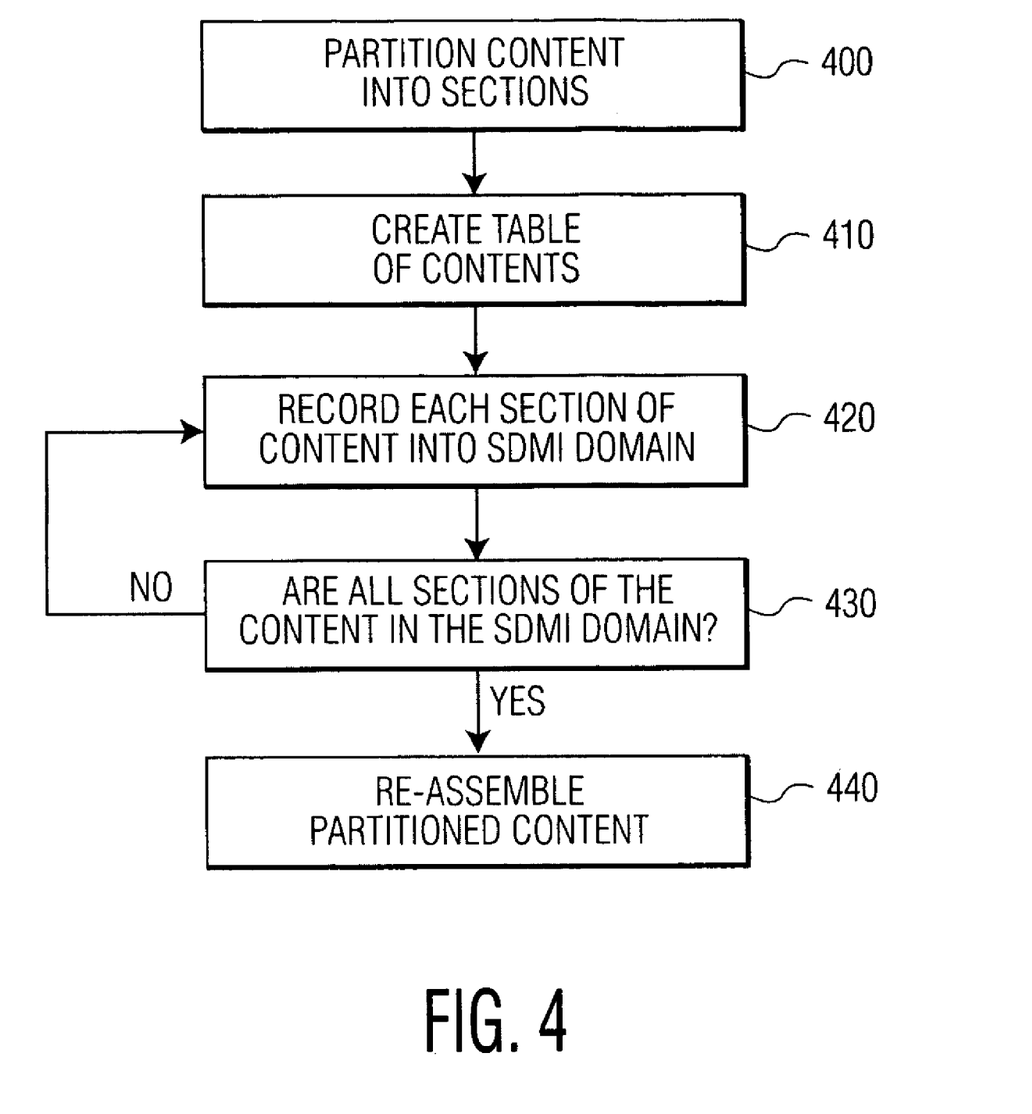
FIG. 4 is a flow diagram illustrating the steps of a method of attack on a screening algorithm in accordance with another illustrative embodiment of the present invention.

Referring now to FIG. 4, a flow diagram is shown illustrating the steps of the method of attack on a screening algorithm based on partitioning of the screened content in accordance with another illustrative embodiment of the present invention.

The first step 400 in an embodiment of the method of attacking a screening algorithm in accordance with the present invention is to partition the illicit content into sections. The duration of each section is preferably less than the duration of a section threshold duration value assigned by the screening algorithm. Next, in step 410, a table of contents is created to identify the relative positions of the partitioned sections, such that the attacker will have the ability to re-assemble the content once it has been admitted into the SDMI domain.

Once the content is partitioned, each section of the content is recorded in the SDMI domain in step 420. Upon recording each section of the content in the SDMI domain, the sections will be subjected to an SDMI screening algorithm such as CDSafe or SDMI Lite before it can be admitted into the domain.

In the previous embodiment, the entire content was submitted to be recorded in the SDMI domain. In the current embodiment, the content is recorded in the SDMI domain one section at a time. Therefore, the method for attacking the screening algorithm will need to be repeated twelve times for content that has been partitioned into twelve sections, depending on the constraints set in the screening algorithm and the size of each section. However, due to the fact that the content is being recorded one section at a time, it is likely that each of the sections will pass the screening algorithm on the first pass.

In step 430, a determination is made as to whether all sections of the content are in the SDMI domain. If all sections of the content are not within the SDMI domain, the user is instructed to record the next section. When all sections of the content have passed the screening algorithm, the partitioned content is re-assembled into its initial configuration in step 440. At this point, the attacker has successfully downloaded illicit content, thereby circumventing the screening algorithm.

In an alternative to the embodiment described with reference to FIG. 4, the duration of each section which the content is divided into is made smaller than previously contemplated. More specifically, the duration of each section is preferably shorter than the feasible duration necessary to read a watermark. For example, the duration of each section may be in the range of about 0.1 seconds to about 1.5 seconds. Therefore, the smaller sections will have a greater likelihood of passing through the screening algorithm.

In the current embodiment, the content to be recorded in the SDMI domain has been partitioned into sections that are so short that it is likely that the screening algorithms will not be launched since the duration of each section will not meet the minimum threshold value of the screening algorithm. Moreover, even if the screening algorithm is launched, it is very likely that the sections will be admitted to the domain since the algorithms will not recognize a readable watermark. The method for attacking the screening algorithm will need to be repeated for each of the plurality of sections of content until each of the sections is in the SDMI domain.

Figure 5:
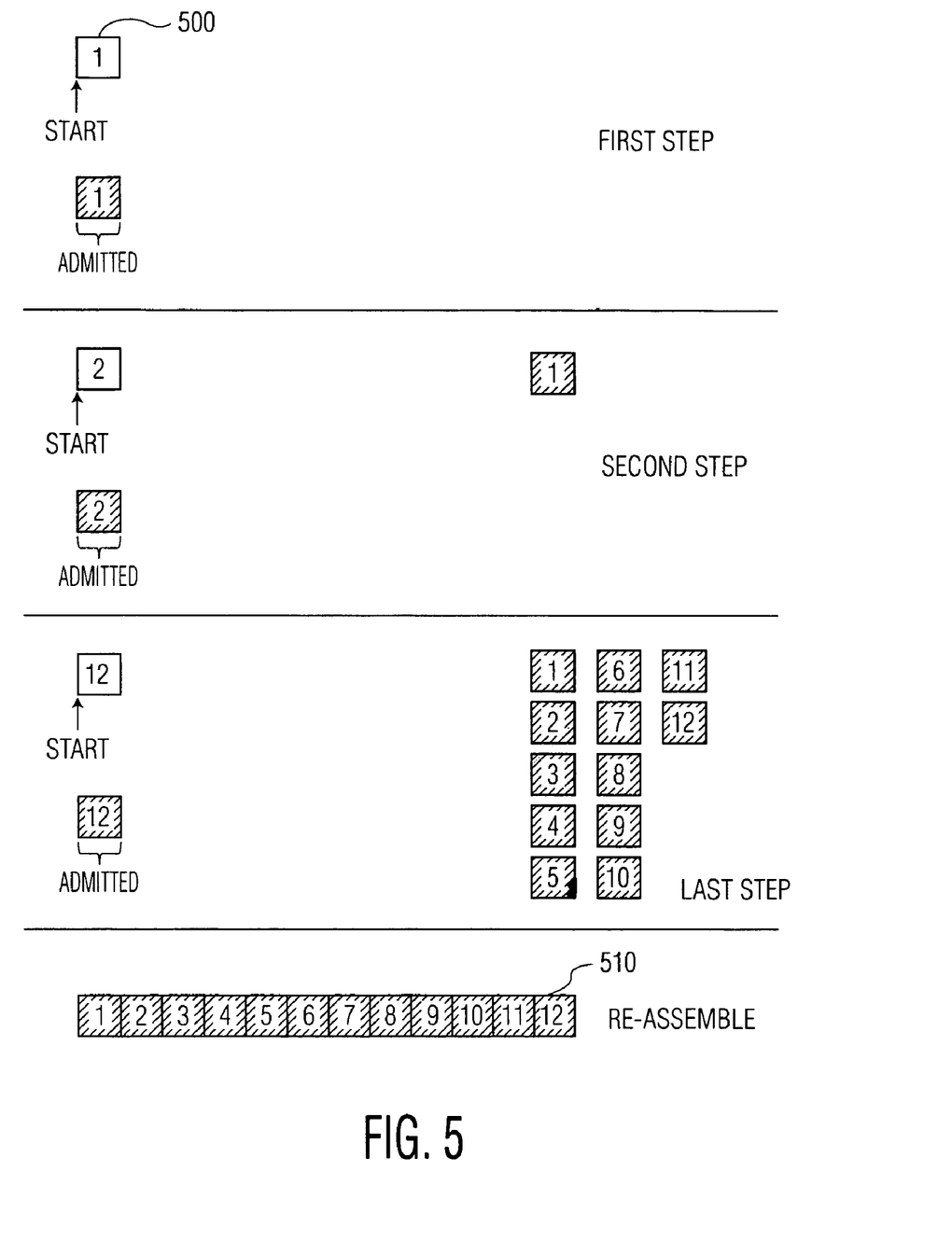
FIG. 5 is a diagram illustrating an example of the steps of a method of attack on a screening algorithm in accordance with the embodiment described with reference to FIG. 4.

Referring now to FIG. 5, a diagram illustrating an example of the steps of a method of attack on a screening algorithm in accordance with the embodiment described with reference to FIG. 4 is shown. Initially, a block of content is partitioned into a predetermined number of sections (not shown). In the illustrative embodiment illustrated in FIG. 5, the content is partitioned into twelve (12) sections. As shown, only one section 500 is submitted to the screening algorithm at a time. Thus, for content that was partitioned into twelve sections, the procedure will need to be repeated twelve times for the entire content to be admitted into the SDMI domain. The final step in the process (after the entire content is in the SDMI domain) is to re-assemble the content, as indicated by reference numeral 510.

Figure 6:
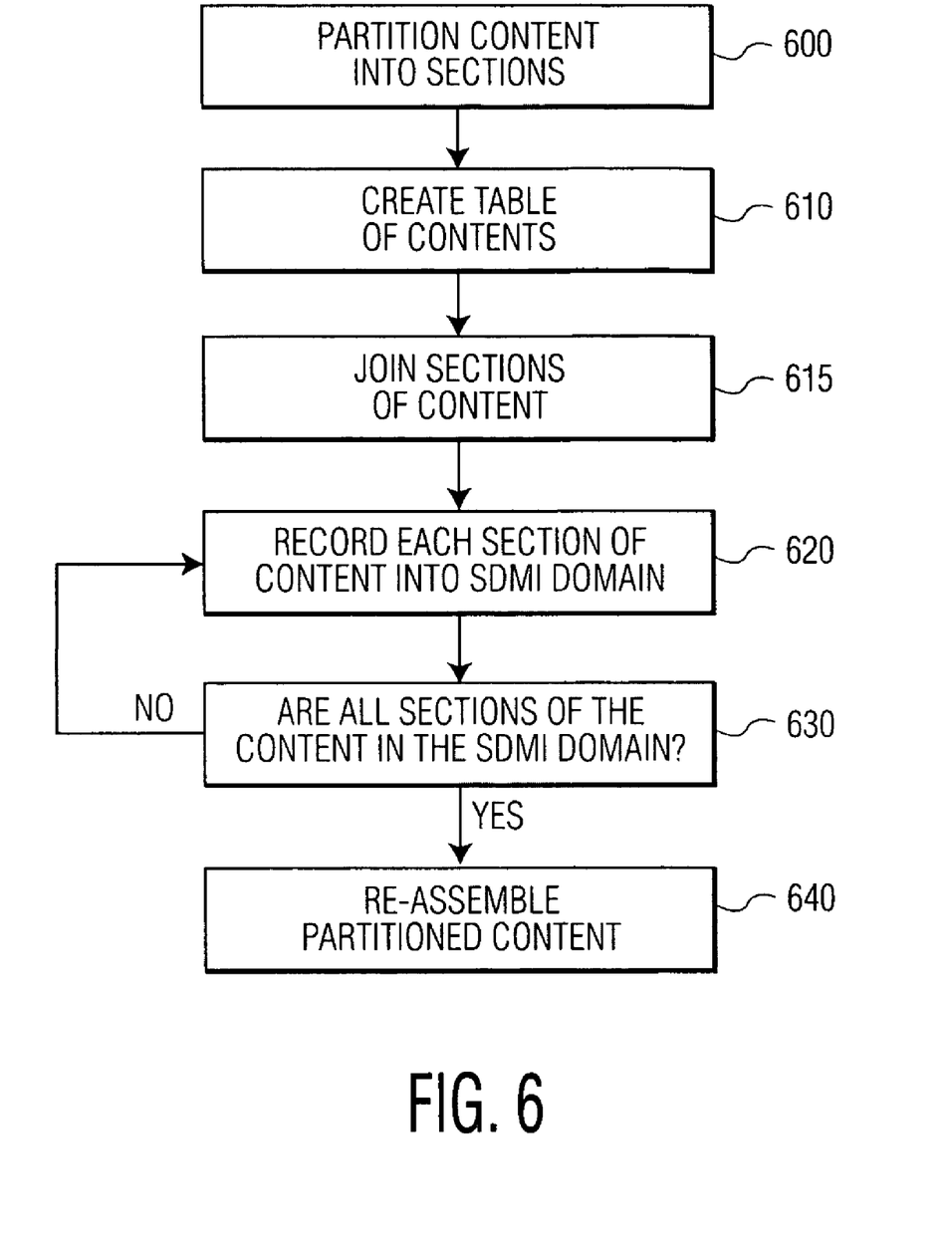
FIG. 6 is a flow diagram illustrating the steps of a method of attack on a screening algorithm in accordance with another illustrative embodiment of the present invention.

Referring now to FIG. 6, a flow diagram is shown illustrating the steps of a method of attack on a SDMI screening algorithm based on partitioning of the screened content in accordance with yet another illustrative embodiment of the present invention.

The embodiment described with reference to FIG. 6 recognizes the fact that partitioning the content into a plurality of sections of shorter duration will cause the rate of transfer of data from the source to the SDMI domain to decrease. Therefore, to increase the rate of transfer, it is contemplated that the plurality of sections of content may be joined together in groups so that they are recorded in the SDMI domain in larger blocks. Preferably, the groups are formed randomly. Advantageously, by first partitioning the content into such small sections and then recombining the sections randomly, any watermarks that may have existed in the original content will not be legible in the randomly combined block and will therefore pass through the screening algorithm.

Accordingly, the first step 600 in this embodiment of the present invention is to partition the illicit content into a plurality of sections. Next, in step 610, a table of contents relating to the original order of the sections is created. Although FIGS. 2, 4 and 6 illustrate the partitioning step taking place prior to creating the table of contents, it is to be appreciated that the table of contents may be created before the content is partitioned.

In step 615, at least two of the sections are joined together. The sections to be joined are chosen randomly to further scramble any watermark that may exist in the sections. Once the content is accounted for in the table of contents, partitioned, and rejoined into larger sections, each joined section of the content is recorded in the SDMI domain in step 620. Upon recording each section of the content in the SDMI domain, the sections will be subjected to an SDMI screening algorithm such as SDMI Lite or CDSafe before they can be admitted in the domain.

In step 630, a determination is made as to whether all sections of the content are in the SDMI domain. If all sections of the content are not within the SDMI domain, the user is instructed to record the next section. When all sections of the content have passed the screening algorithm, the partitioned content is reassembled into its initial configuration in step 640. At this point, the attacker has successfully downloaded illicit content, thereby circumventing the screening algorithm.

The above-described embodiments of the invention are intended to be illustrative only. For example, it is contemplated that the sections may be shuffled out of their original order, or otherwise mixed up to make it more difficult for the screening algorithm to detect illicit content. For example, where the content is a digital content, the content may be partitioned into sections and the sections may be shuffled via a digital signal processor as is known to one having ordinary skill in the art. Under this scenario, the establishment of an accurate and comprehensive table of contents is important.

Additionally, although the present invention is described with reference to the SDMI Lite and CDSafe screening algorithms, the present invention may be applied to any screening algorithm. These and numerous other embodiments within the scope of the following claims will be apparent to those skilled in the art.

What is claimed is:

1. A processor-implemented method of attacking a screening algorithm comprising:

identifying content to be downloaded by inputting the content to a processing device;

partitioning the content using a program executed by the processing device into at least two sections wherein each of the at least two sections has a duration that is less than a threshold duration value assigned by the screening algorithm;

subjecting the partitioned content to the screening algorithm; and restoring the integrity of the content by reassembling the at least two sections subsequent to the at least two sections passing through the screening algorithm.

2. The method of claim 1, wherein the screening algorithm is a Secure Digital Musical Initiative screening algorithm.

3. The method of claim 1, wherein the screening algorithm relies on a sampling data contained within the content.

4. The method of claim , wherein the content is downloaded from the Internet.

5. The method of claim 1, further comprising writing the content to a memory device subsequent to the content being subjected to and passing the screening algorithm.

6. The method of claim 1, wherein the duration of each of the at least two sections is in the range of about 0.1 seconds to about 1.5 seconds.

7. The method of claim 1, wherein the content is subjected to the screening algorithm one section at a time.

8. The method of claim 1, further comprising determining whether all of the sections of the content have passed through the screening algorithm.

9. The method of claim 1, wherein the sections of content are combined in groups prior to the screening algorithm.

10. The method of claim 9 wherein the sections of content are randomly combined in groups.

11. The method of claim 1, further comprising shuffling the sections of content prior to the sections being subjected to the screening algorithm.

12. The method of claim 1, further comprising creating a table of contents relating to the order of the sections of the content.

13. An apparatus for attacking a screening algorithm comprising a processing device that includes a processor and a memory, the processor being configured to:

identify content to be downloaded;

partition the identified content into at least two sections; and restore the integrity of the content by reassembling the at least two sections subsequent to the at least two sections passing through the screening; and subject the partitioned content to the screening algorithm, wherein each of the at least two sections has a duration that is less than a duration of a threshold duration value assigned by the screening algorithm.

14. An article of manufacture for attacking a screening algorithm, the article comprising a machine readable medium containing one or more programs which when executed implement the steps of:

identifying content to be downloaded and;

partitioning the content into at least two sections, wherein each of the at least two sections has a duration that is less than a duration of a threshold duration value assigned by the screening algorithm;

subjecting The partitioned content to the screening algorithm; and restoring the integrity of the content by reassembling the at least two sections subsequent to the at least two sections passing through the screening algorithm.

* * * * *